(12) United States Patent
Chitilian et al.

(10) Patent No.: US 11,769,170 B2
(45) Date of Patent: *Sep. 26, 2023

(54) APPLICATION PROGRAM INTERFACE SCRIPT CACHING AND BATCHING

(71) Applicant: Google LLC, Mountain View, CA (US)

(72) Inventors: Varouj A. Chitilian, Hillsborough, CA (US); Ilya Netchitailo, San Jose, CA (US); Nikhil Bakshi, Mountain View, CA (US); Jiaqi Yu, Hayward, CA (US); Chetan Patel, Fremont, CA (US)

(73) Assignee: Google LLC, Mountain View, CA (US)

( * ) Notice: Subject to any disclaimer, the term of this patent is extended or adjusted under 35 U.S.C. 154(b) by 393 days.

This patent is subject to a terminal disclaimer.

(21) Appl. No.: 16/862,322

(22) Filed: Apr. 29, 2020

(65) Prior Publication Data

US 2020/0258115 A1 Aug. 13, 2020

Related U.S. Application Data

(63) Continuation of application No. 13/474,977, filed on May 18, 2012, now Pat. No. 10,679,240.

(Continued)

(51) Int. Cl.
*G06Q 30/0242* (2023.01)
*G06F 9/54* (2006.01)
*G06F 9/46* (2006.01)
*G06F 16/2455* (2019.01)
*G06Q 30/0273* (2023.01)
(Continued)

(52) U.S. Cl.
CPC ......... *G06Q 30/0242* (2013.01); *G06F 9/448* (2018.02); *G06F 9/46* (2013.01); *G06F 9/5005* (2013.01); *G06F 9/541* (2013.01); *G06F 9/542* (2013.01); *G06F 9/547* (2013.01); *G06F 16/24552* (2019.01); *G06Q 10/06* (2013.01); *G06Q 30/0243* (2013.01); *G06Q 30/0244* (2013.01); *G06Q 30/0251* (2013.01); *G06Q 30/0258* (2013.01); *G06Q 30/0263* (2013.01); *G06Q 30/0275* (2013.01);
(Continued)

(58) Field of Classification Search
None
See application file for complete search history.

(56) References Cited

U.S. PATENT DOCUMENTS 5,404,528 A * 4/1995 Mahajan ............. G06F 9/45512
719/331
6,330,583 B1 12/2001 Reiffin
(Continued)

FOREIGN PATENT DOCUMENTS

GB WO 03069924 A2 * 8/2003 ............ H04M 15/41

OTHER PUBLICATIONS

"Campaign Management" PCC Campaign Management (Pay Per Click) Paid Search [online]. [Retrieved on May 4, 2012]. Retrieved from Internet electronic mail: http://www.marinsoftware.com/products/campaign-management, 1 page.
(Continued)

*Primary Examiner* — Charles E Anya
(74) *Attorney, Agent, or Firm* — Fish & Richardson P.C.

(57) ABSTRACT

Methods, systems, and apparatus, including computer programs encoded on a computer storage medium, for managing application program interface calls.

18 Claims, 9 Drawing Sheets

Related U.S. Application Data

(60) Provisional application No. 61/555,092, filed on Nov. 3, 2011, provisional application No. 61/555,071, filed on Nov. 3, 2011, provisional application No. 61/555,068, filed on Nov. 3, 2011, provisional application No. 61/555,086, filed on Nov. 3, 2011, provisional application No. 61/525,459, filed on Aug. 19, 2011.

(51) Int. Cl.
  *G06Q 30/0251* (2023.01)
  *G06Q 30/0241* (2023.01)
  *G06F 9/448* (2018.01)
  *G06F 9/50* (2006.01)
  *G06Q 10/06* (2023.01)

(52) U.S. Cl.
  CPC ..... *G06Q 30/0276* (2013.01); *G06Q 30/0277* (2013.01); *G06Q 30/0241* (2013.01)

(56) References Cited

U.S. PATENT DOCUMENTS

| | | | |
|---|---|---|---|
| 7,543,273 | B2 | 6/2009 | Chow |
| 7,711,797 | B1* | 5/2010 | Huang ............... H04L 67/5681 710/36 |
| 7,873,660 | B1* | 1/2011 | Wong ................. G06F 21/6245 707/705 |
| 2004/0103044 | A1 | 5/2004 | Vandewater |
| 2004/0260767 | A1* | 12/2004 | Kedem ............. G06Q 30/0264 705/14.42 |
| 2007/0214457 | A1 | 9/2007 | Goyal et al. |
| 2008/0256541 | A1 | 10/2008 | Rai |
| 2009/0172674 | A1 | 7/2009 | Bobak |
| 2010/0228597 | A1* | 9/2010 | Das ....................... G06Q 30/02 705/26.1 |
| 2011/0040824 | A1 | 2/2011 | Harm |
| 2012/0278397 | A1* | 11/2012 | Lindsay ............... G06F 9/5027 709/206 |
| 2012/0324000 | A1* | 12/2012 | Kang ..................... G06F 9/546 709/204 |

OTHER PUBLICATIONS

"Kenshoo and Criteo Partnership Results in Stronger Insights & Performance Across Search & Retargeting" Kenshoo [online]. [Retrieved on May 4, 2012]. Retrieved from Internet electronic mail: http://www.kenshoo.com/imgs/Kenshoo_Retargeting_Case_Study.pdf, 1 page.
"Kenshoo Editor 2.0" Kenshoo [online]. [Retrieved on May 4, 2012]. Retrieved from Internet electronic mail: http://www.kenshoo.com/imgs/Kenshoo_Editor_Brochure.pdf, 1 page.
"Kenshoo Enterprise" Kenshoo [online]. Copyright 2012. [Retrieved on May 4, 2012]. Retrieved from Internet electronic mail: http://www.kenshoo.com/Enterprise, 2 pages.
"Kenshoo Portfolio Optimizer" Kenshoo [online]. [Retrieved on May 4, 2012]. Retrieved from Internet electronic mail: http://www.kenshoo.com/imgs/RealTime_Campaigns.pdf, 3 pages.
"Kenshoo Universal Platform" Kenshoo [online]. [Retrieved on May 4, 2012]. Retrieved from Internet electronic mail: http://www.kenshoo.com/imgs/Kenshoo_Universal_Platform_Brochure.pdf, 2 pages.
"Optimization Platform" Adobe, Efficient Frontier [online]. [Retrieved on May 14, 2012]. Retrieved from the Internet electronic mail: http://www.efrontier.com/innovation/optimization-platform, 5 pages.
"RealTime CampaignsTM" Kenshoo [online]. [Retrieved on May 4, 2012]. Retrieved from Internet electronic mail: http://www.kenshoo.com/imgs/Kenshoo_Editor_Brochure.pdf, 1 pages.
"Retargeting: Kenshoee + Criteo" Kenshoo [online]. [Retrieved on May 4, 2012]. Retrieved from Internet electronic mail: http://www.kenshoo.com/imgs/KenshooRetargeting_Brochure.pdf, 1 page.
"Solutions For Advertisers" Clickable [online] [Retrieved on May 4, 2012]. Retrieved from Internet electronic mail: http://www.clickable.com/advertising-solutions/default.aspx, 2 pages.
Andre Tost, Planning and Handling Timeouts in Service-oriented Environments, InternetArchive WayBack Machine URL Date of Oct. 8, 2009, Retrieved from URL: http://www.ibm.com/developerworks/websphere/techjournal/0909_tost/0909_tost.html.
Brian Tracy, 7 Secrets to Success, Jan. 2, 2007, Entrepreneur, Retrieved from URL: https://www.entrepreneur.com/article/173484.
Center for the Study of Social Policy, Customer Satisfaction, Feb. 2007, Retrieved from URL: http://www.cssp.org/publications/constituents-co-invested-in-change/customer-satisfaction/customer-satisfaction-frameworkimproving-quality-and-access-to-services-and-supports-in-vulnerable-neighborhoods.pdf.

* cited by examiner

APPLICATION PROGRAM INTERFACE SCRIPT CACHING AND BATCHING

CROSS-REFERENCE TO RELATED APPLICATIONS

This application is a continuation application of, and claims priority to, U.S. patent application Ser. No. 13/474,977, now U.S. Pat. No. 10,679,240, titled "APPLICATION PROGRAM INTERFACE SCRIPT CACHING AND BATCHING," filed on May 18, 2012, which application claims the benefit under 35 U.S.C. § 119(e) of U.S. Patent Application No. 61/525,459, entitled "Advertiser Campaign Scripting," filed Aug. 19, 2011; U.S. Patent Application No. 61/555,092, entitled "Advertiser Campaign Script Execution Management," filed Nov. 3, 2011; U.S. Patent Application No. 61/555,086, entitled "Advertiser Service Scripting," filed Nov. 3, 2011; U.S. Patent Application No. 61/555,068, entitled "Application Program Interface Script Caching And Batching," filed Nov. 3, 2011; and U.S. Patent Application No. 61/555,071, entitled "Advertising Campaign Script Execution Management," filed Nov. 3, 2011. The disclosure of each of the foregoing applications is incorporated herein by reference in their entirety.

BACKGROUND

This specification relates managing application program interface calls for script execution in, for example, an advertising management environment.

The Internet enables access to a wide variety of content items, e.g., video and/or audio files, web pages for particular subjects, news articles, etc. Such access to these content items likewise enables opportunities for targeted advertising. For example, advertisements can be provided with search results in response to a search query provided by a user; provided for web pages of third party online publishers that have content related to the advertisement; or provided in response to a specific request from a user, such as when a user requests information for particular products or services.

An advertising management system can be used to facilitate the value exchange between advertisers and publishers. Advertisers provide advertisements, specify targeting criteria for ad campaigns, and offer bids for the opportunities to have their advertisements presented on publishers' webpages. Online advertisers use advertising management tools to manage their advertising campaigns. These management tools include an account interface that allows an advertiser to create and define various aspects of advertising campaigns and ad groups, such as keywords, targeting criteria, budgets, bids for ad placement, duration, different types of advertisements, and so on. After the advertiser has specified the campaign and ad group data and activated the advertising campaigns and/or ad groups, advertisements can be dynamically selected and served on publishers' webpages according to the various keywords and other targeting criteria specified by the advertiser.

Once an advertising campaign is launched, and advertiser uses the advertising management tools to monitor the performance of the advertising campaign. One system allows the use of scripts to manage an advertising campaign. Depending on the performance of the advertising campaign, execution of the script results in changes to targeting, bids, budgets, advertisements, etc., of the advertising campaign. However, the advertising campaign may have thousands of bids, tens of thousands of targeting criteria, and various other associated data. In the situation in which a script execution engine is implemented in a manner in which the script execution engine must communicate with the advertisement management system though one or more APIs, requests for data and changes to data may result in tens of thousands of data elements being requested and modified for a script execution in an API call. This can result in multiple API calls between the respective systems, and some API calls may be prone to failure due to the sheer size of the data set(s) underlying the call.

SUMMARY

In general, one innovative aspect of the subject matter described in this specification can be embodied in methods that include the actions of executing, for each of a plurality of rules, a corresponding script defining the rule, the rule being associated with a campaign management entity of an advertising campaign and defining an operation and a corresponding event, the event being the occurrence of a condition defined for the campaign management entity, and the operation being specifying an entity change for the associated campaign management entity, the execution of the script comprising: generating a first API call to an advertising service, the first API call for first entities corresponding to the campaign management entity and receiving a set of first entities response to the API call and storing the set of first entities in a local cache that is local to the data processing apparatus, processing an instruction for a request for second data associated with one of the first entities and in response: determining whether the second data associated with the one of the first entities is stored in the local cache; in response to the determining that the second data is not stored in the local cache: expanding the request for second data associated with one of the first entities to a request for second data associated with a plurality of the first entities in the set of first entities, and generating a second API call to the advertising service for the expanded request; and in response to the determining that the second data is stored in the local cache, accessing the local cache for the second data. Other embodiments of this aspect include corresponding systems, apparatus, and computer programs, configured to perform the actions of the methods, encoded on computer storage devices.

In general, another innovative aspect of the subject matter described in this specification can be embodied in methods that include the actions of 1. executing by a data processing apparatus, for each of a plurality of rules, a corresponding script defining the rule, the rule being associated with a campaign management entity of an advertising campaign and defining an operation and a corresponding event, the event being the occurrence of a condition defined for the campaign management entity, and the operation being specifying an entity change for the associated campaign management entity, the execution of the script comprising: identifying requests to an advertising service, the requests collectively being for a first cardinality of first entities of a same type and corresponding to the campaign management entity; selecting a cardinality limit associated with the entity type; for requests in which the first cardinality is greater than the cardinality limit, generating a plurality of API calls to the advertising service for the first entities, each of the API calls specifying up to the cardinality limit of first entities; and for requests in which the first cardinality is less than the cardinality limit, generating a API call to the advertising service for the first entities. Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. The invocation of various rules based on detected events allows advertisers to automate the changing of many features of an advertising campaign. The automation of such changes allows advertisers to focus more time on the effects of the change and less time on manual processes to implement changes. This shift in focus, in turn, allows advertisers to devote more time to achieving the goals of their campaign, and this leads to better campaign management.

The system that provides for management and execution of the rules may be external to an advertising management system that manages and stores campaign data upon which the rules operate. Accordingly, the two separate systems communicate by means of application programming interface (API) calls. During execution of a rule, an API call requested data for a first entity can be expanded to request that same corresponding data for all previously requested entities. The expansion of the API call can drastically reduce the number of API calls between the systems, which, in turn, frees up processing resources. The system can dynamically expand the API calls during script execution, and thus script coding optimization techniques need not be utilized at the script level.

Additionally, during execution API calls for the same entity types can be batched for more efficient utilization of API resources. The system can monitor success and failures of API calls (e.g., monitor for API call timeouts, batch update failures, etc.). The system can dynamically adjust the number (cardinality) of entities being requested or updated for API calls until a desired success rate is achieved. The batching of the API call into apportioned API calls facilitates the writing of scripts that do not need to take into account pre-defined call limits. Furthermore, when an operation on a particular entity fails, the API call can be regenerated to omit the particular entity, thus ensuring at least partial success of a particular batch execution.

The advantages listed above are not exhaustive, and other advantages are also realized.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is an example user interface for keyword rules at an ad group level.

FIG. 4 is an example user interface for ad group rules at an ad group level.

Like reference numbers and designations in the various drawings indicate like elements.

DETAILED DESCRIPTION

Example Environment

Figure 1A:
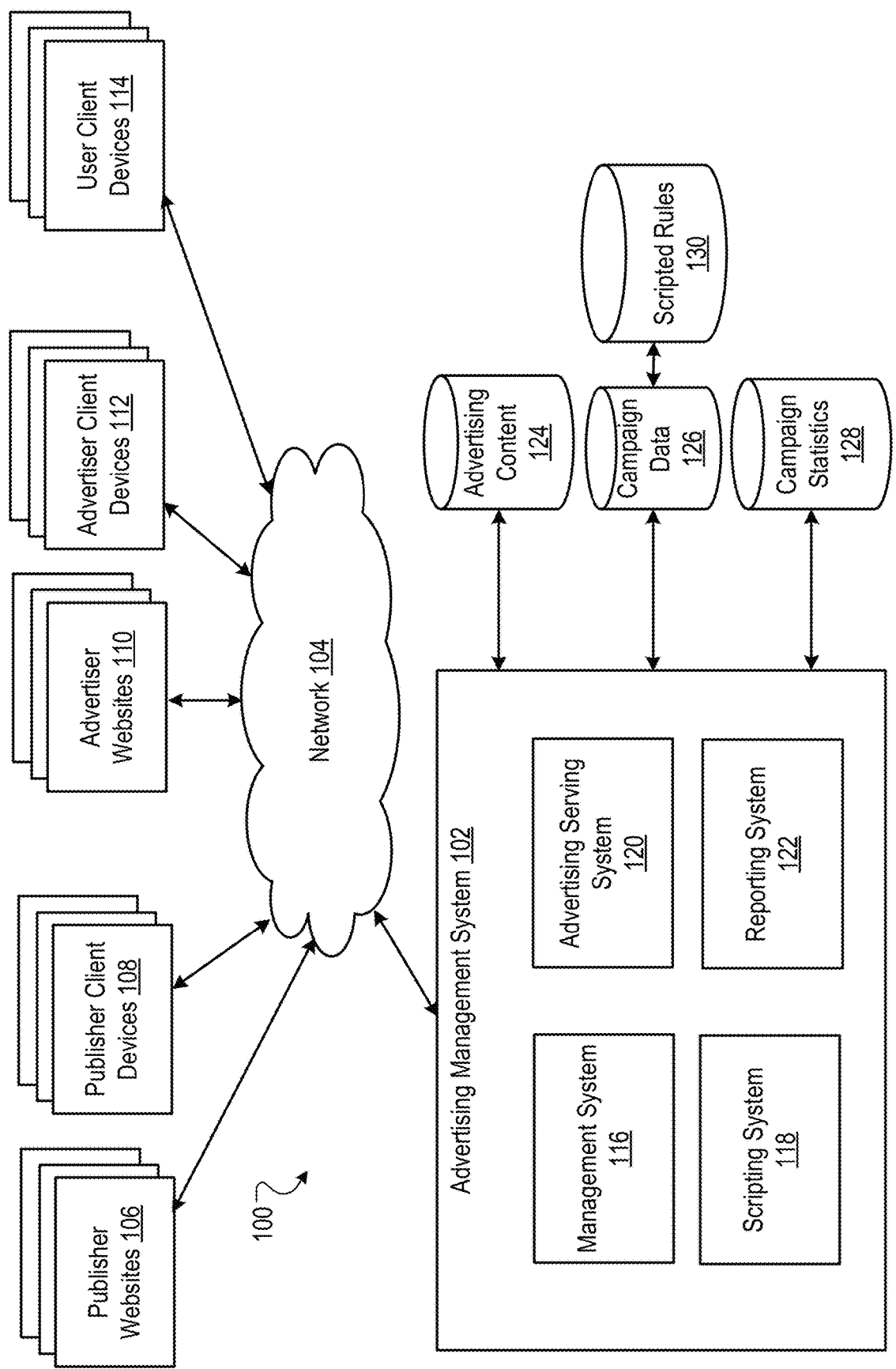
FIG. 1A is a block diagram of an example online advertising environment.

FIG. 1 is a block diagram of an example online advertising environment 100. The online advertising environment 100 utilizes an advertising management system 102 to facilitate the sale and purchase of online advertising opportunities between publishers and advertisers.

The online advertising environment 100 includes a computer network 104, such as a local area network (LAN), wide area network (WAN), the Internet, or a combination thereof, connecting publisher websites 106, publisher client devices 108, advertiser websites 110, advertiser client devices 112, user client devices 114, and the advertising management system 102. The advertising management system 102 further has access to an advertising content store 124, a campaign data store 126, and a campaign statistics store 128.

Each publisher website 106 has one or more webpage resources associated with a domain name, and each publisher website 106 is hosted by one or more servers. An example website is a collection of webpages formatted in hypertext markup language (HTML) that can contain text, images, multimedia content, and programming elements. Each publisher website 106 is maintained by a publisher, e.g., an entity that manages and/or owns the web site.

Publisher client devices 108, advertiser client devices 112, and user client devices 114 are electronic devices that are under the control of users. In particular, the publisher client devices 108 are under control of users that are agents of the publishers, the advertiser client devices 112 are under the control of users that are agents of the advertisers, and user client devices 114 are under the control of users that are not associated with the publishers or advertisers. A client device typically includes a user application, such as a web browser, to facilitate the sending and receiving of data over the network 104.

The advertising management system 102 facilitates the sale and purchase of advertising opportunities between publishers 106 and advertisers 110. The advertising management system 102 includes components such as a management system 116, a scripting system 118, an advertising serving system 120, and a reporting system 122. The advertiser management system 116 provides user interfaces for advertisers (e.g., using advertiser client devices 112) to define advertising campaigns and ad groups, submit advertising content, and specify various targeting and/or ad placement criteria for the advertising content in each advertising campaign and/or ad group. The advertising content is stored in the advertising content store 124 and the targeting and ad placement criteria are stored in the campaign data store 126. For each ad group or campaign, the advertisers can also specify bids for ad slots associated with particular keywords through the interface provided by the advertiser management system 116. Advertisers' bids, budgets, as well as other campaign related preferences are also stored in the campaign data store 126.

An account management tool can be employed by an advertiser to create and manage a large number of online advertising campaigns for various products and services that the advertiser offers. The account management tool can be made available to the advertiser either through an online interface provided by the advertiser management system 116 or as a account management software application installed and executed locally at the advertiser's client devices 112. The online interface and/or the locally executed account management software application can be used for downloading existing account data from the advertiser management system 116 and for uploading new and/or modified account data to the advertiser management system 116.

The advertiser can create and manage multiple advertising campaigns using the account management tool offered by the advertiser management system 116. The advertiser to can further specify multiple ad groups under each ad campaign, and specify respective advertisements, budgets, keywords, and other targeting and/or ad placement criteria for each of the ad groups. Typically, the advertising account can be abstracted into a hierarchical structure. For example, the advertising account can include one or more ad campaigns, each ad campaign can include one or more ad groups, and each ad group can include one or more advertisements and keywords.

Each advertising campaign is represented in the campaign data stores as a collection of associated campaign entities. Each particular advertising campaign is represented by an advertising campaign entity for the advertising campaign, and each advertising campaign entity can be associated with one or more advertisement group entities, each of which defines an advertisement group. Each advertising group entity, in turn, is associated with respective advertisement entities, a budget entity, targeting entities, and bid entities. Each respective advertisement entity defines an advertisement, the budget entity defines a budget, each targeting entity defines a targeting criterion, and each bid entity defines a bid. Other entity associations are also possible, e.g., an advertising campaign entity can be associated with a budget entity defining an overall budget, etc.

To create a new ad campaign, a user can first specify values for the campaign level advertising parameters of the ad campaign. The campaign level advertising parameters include, for example, a campaign name, a preferred content network for placing ads, a budget for the ad campaign, start and end dates for the ad campaign, a schedule for ad placements, a targeted language, and targeted geographical locations. Other campaign level advertising parameters includes, for example, a payment scheme such as a cost-per-click (CPC), cost per thousand impressions (CPM), cost-per-action (CPA), and so on.

For the ad campaign, the user can further define one or more ad groups. An ad group contains one or more advertisements, which target a particular set of keywords, ad placements, or both. Ad groups under the same campaign can share the same campaign level advertising parameters, but have tailored specifications for particular ad group level advertising parameters, such as keywords, bids for keywords, budget, and so on.

Generally, an advertiser can create different ad groups to have more focused targeting on different product lines or services. For example, different sets of keywords specific to the different product lines or services can be used for the different ad groups. Sometimes, different ad groups can also target different market segments and/or demographic characteristics. Keywords specific for the different market segments and/or demographic characteristics can be included in the different ad groups.

To create a new ad group, the user can first specify values for the ad group level advertising parameters of the ad group. The ad group level advertising parameters include, for example, an ad group name, and various bids for different ad placement opportunities (e.g., automatic placement, advertiser managed placement, etc.) or outcomes (e.g., clicks, impressions, conversions). An ad group name can be one or more terms that the user can use to concisely capture a topic or subject matter that the ad group is targeting. For example, a car dealership can create a different ad group for each type of vehicles it carries, and may further create a different ad group for each model of vehicles it carries. Examples of the ad group themes that the car dealership can use include, for example, "sports car," "sedan," "truck," "hybrid," and so on.

After creating the campaign and one or more ad groups under the campaign, the advertiser can specify one or more keywords and advertisements to each ad group. The keywords are typically terms that are relevant to the product or services that the user wishes to promote for the ad group. Each keyword can include one or more terms. For example, the car dealership may include "automobile", "sports car," "V-6 engine," "four-wheel drive," "fuel efficiency," and so on as keywords for its ad groups and ad campaigns. The advertiser can also specify whether exact match of keywords are required for ad placements on the content network.

In addition to keywords, for each ad group, the advertiser can also specify a number of advertisements for selection by the ad server when an advertising opportunity becomes available that matches the budget, ad schedule, maximum bids, keywords, and other targeting criteria specified for the ad group. Different types of ads can be included in an ad group, such as a text ad, an image ad, a local business ad, a mobile ad, and so on.

Other aspects of the ad group can be defined in terms of various advertising parameters and specified by user-entered values or default values for those various advertising parameters. After the advertiser has specified all the required advertising parameters for each level and aspect of the ad campaign(s), the advertising campaign entity data (e.g., including the campaign structure and the advertising parameters on each level within the campaign structure) can be uploaded to the advertiser management system 116, and the data are persisted to the campaign data store 126. The advertising campaign can be created and activated according to the advertising campaign data specified by the advertiser.

The management system 116 also provides an interface for publishers (e.g., using publisher client devices 108) to specify ad slots available on the publisher's online properties. For example, the publishers can specify the cost, type, dimensions, and targeting criteria (e.g., keywords associated with the content of the online properties) for each ad slot. The publisher management server 118 provides scripts or references to scripts to the publishers according to the specifications of the ad slots.

Each publisher 106 can insert instructions into its webpages or content items. When the webpages and content items are downloaded to user client devices 114, the instructions are executed to generate one or more ad requests to the advertising management system 102. The advertising serving system 120 of the advertising management system 102 responds to the ad requests by sending advertisements to the requesting user client device 114 for insertion into appropriate ad slots in the publisher's webpages or content items as rendered on the requesting user client device 114. The advertisements can include embedded links to landing pages (e.g., webpages on the advertisers' websites 110) that a user is directed to when the user clicks on the advertisements presented on the publisher's webpages or in the content items.

The ad requests are optionally associated with user characteristics (e.g., user's age, gender, income, language preferences, and so on) and advertising context (e.g., keywords associated with webpage content, location, local time of ad request, and so on).

Various user privacy measures are implemented to remove personally identifiable information from the user characteristics data. The advertising serving system 120 can select advertisements from the advertising content store 124 for each ad request based on a match between an advertiser's campaign criteria in the campaign data store 126 and the user characteristics and advertising context associated with the ad request.

The advertisements provided after a successful match, and optionally user responses (e.g., click-throughs, conversions, and so on) to the advertisements, can be tracked by various tracking mechanisms (e.g., tracking cookies, pixel callbacks, etc.), sent back to the advertising management system 102, and stored in the campaign statistics store 128. The tracking is enabled by various user opt-in processes. The reporting system 122 provides user interfaces for advertisers and publishers to review reports on the campaign statistics in various formats. Performance of particular keywords, ad groups, and campaigns can be measured based on various performance metrics, such as cost per action (e.g., click or conversion), conversion length (e.g., number of clicks between initial impression and conversion), and so on.

Scripting System

The advertising management system 102 also includes a scripting system 118 that facilitates advertising server scripting for automated management of an online advertising campaign. In some implementations, the scripting system 118 can be a part of the advertisement management system 116, and be realized by series of online user interfaces or a user interfaces generated from locally executed account management software.

Each advertiser, by means of user interface provided by the scripting system 118, can define scripted rules 130 and associate the rules with their advertising campaigns. The scripting system 118 facilitates the automation of actions that allow advertisers to associate campaign management operations with events that trigger the automations. The combination of one or more events and one or more operations is defined as a rule. The advertisement management system 102 monitors for the events, and upon the occurrence of events associated with a particular rule, the operations associated with that rule are executed.

In some implementations, the scripting system 118 pre-authorizes the operation of a rule based on the credentials of a particular user that is generating the rule. For example, if a particular advertising executive of an advertiser generates a rule by use of the scripting system 118, and the user is authorized to manually perform the operations defined by the rule, then the scripting system pre-authorizes the execution of the rule on behalf of the user. In addition, changes made to the campaign according to the specified changes of the rule are attributed to the user. Conversely, if the user is not authorized to manually perform the operations defined by the rule, then the scripting system does not pre-authorize the execution of the rule on behalf of the user.

Each rule is associated with an advertising campaign entity (e.g., directly associated with an advertising campaign entity or associated with a child entity of the advertising campaign entity) and defines an operation and a corresponding event. As used in this specification, an event is the occurrence of a condition defined for the advertising campaign(s) (or child entities of the advertising campaign) by the advertiser. The condition can be budget related, performance related, date related, targeting related, user device type related, etc., and combinations of one or more of these conditions. Events are described in more detail below.

The scripting system 118 executes the operation in response to the detection of the corresponding event. Each operation specifies an entity change for a campaign management entity associated with the advertising campaign entity and the rule.

Figure 1B:
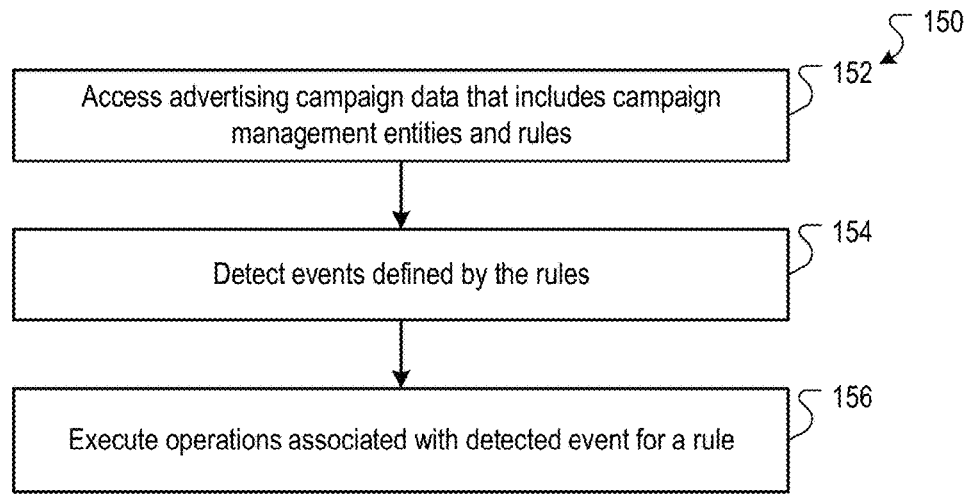
FIG. 1B is a flow diagram of an example process for executing rules associated with a campaign.

FIG. 1B is a flow diagram of an example process 150 for executing rules associated with a campaign. The process 150 can be implemented by the scripting system 118.

The scripting system 118 accesses advertising campaign data that includes campaign entities and rules (152). For example, the scripting system 118 accesses the campaign data store 126 of the advertising management system 102, and scripted rules 130 that are associated with the campaign data and defined by the advertisers.

The scripting system 118 detects events defined by the rules (154). For example, the scripting system 118, for each rule, determines the condition defined by the rule and checks to determine if the condition has occurred. If the condition has occurred, then the event is detected. An example of a condition is a click through rate associated with an ad group exceeding a threshold percentage defined by the advertiser. The conditions can be checked periodically, e.g., according to a frequency parameter associated with the rule. Conditions and frequencies are described in more detail below.

The scripting system 118 executes operations associated with the detected event for a rule (156). For example, scripting system 118 will change values associated with corresponding campaign entities affect by the operation and persist the changes to the campaign data store 126. An example of an operation is a changing of the cost per click bid associated with a particular ad group by a predefined percentage. Operations are described in more detail below.

In some implementations, each rule is also associated with the user identifier of the user that defined the rule. When the operations associated with the event by the rule are executed, the campaign management entity changes that occur are attributed to the user identifier. This allows the advertiser to track responsible parties that authorized the change to particular campaign entities, and, in some implementations, precludes the execution of the operation if authorization privileges associated with the user identifier have been revoked.

Example Scripting User Interfaces

Figure 2A:
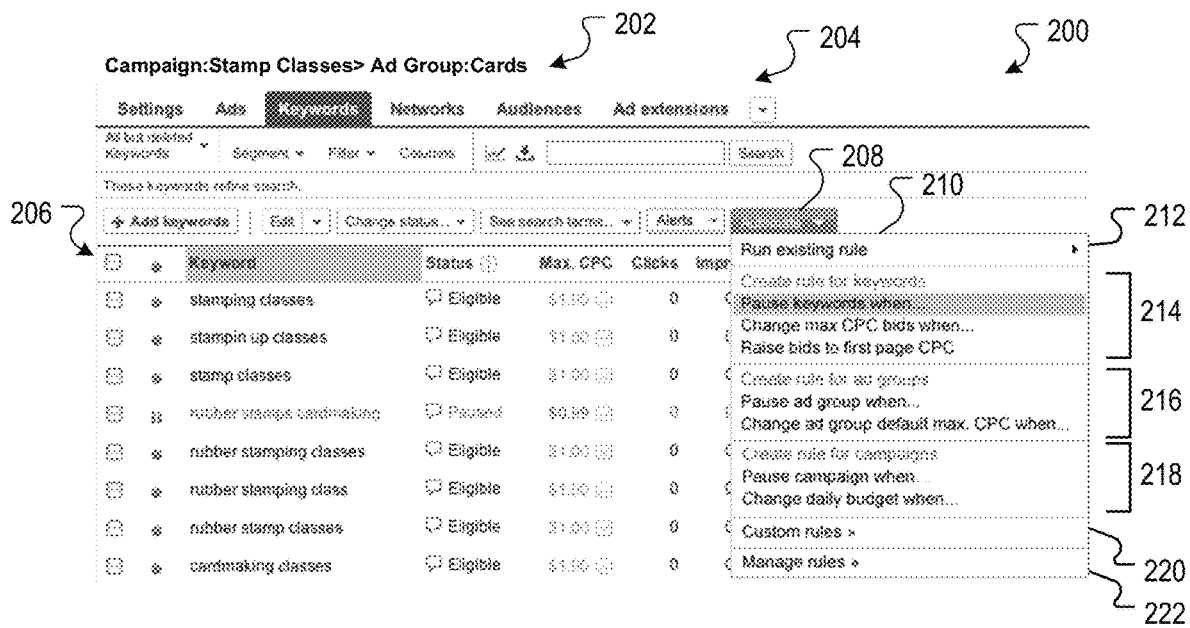
FIG. 2A is an illustration of a user interface through which rules associated with an advertising campaign can be accessed.

The scripting system 118 provides a variety of user interfaces that facilitate the creation of rules for campaigns. FIG. 2A illustrates a user interface 200 through which rules associated with an advertising campaign can be accessed. As shown by the path 202 in FIG. 2A, campaign entities associated with a campaign identified by the advertising campaign entity "stamp classes" and an advertising group identified by the advertising group entity "cards" are displayed. The particular campaign entities that are shown are keyword targeting entities, as indicated by the selected tab of the tab list 204.

Various keywords and associated parameters are identified by data shown in the columns 206. For example, the keywords "stamping classes", "stampin up classes", etc., are associated with the ad group cards of the advertising campaign stamp classes. Thus, advertisements that are associated with this ad group are targeted using the keywords shown. The user may select specific keywords shown in the columns.

The user interface 200 includes an automate menu button 208 that can be used to access and manage rules associated with the advertising group "cards." In response to a selection of the automate menu button 208, the user interface 200 generates an automation menu 210. The menu includes multiple submenus 212, 214, 216, 218, and 222.

In some implementations, the submenus 212, 220, and 222 are static menus that are shown each time an automate menu button 208 is selected, and each additional submenu (e.g., submenus 214, 216, and 218) are contextual menus that are dependent on the particular campaign entity to which the user interface 200 corresponds. In FIG. 2A, for example, the user interface 200 presents keywords at an advertising group level. The contextual submenu 214 corresponds to keywords, and can be used to access an environment for creating rules for keywords. For example, as shown in FIG. 2A, rules with three different types of operations can be created—pausing keywords, changing a max cost per click (CPC) bid, and raising bids to a first page CPC. Likewise, the contextual submenu 216 corresponds to ad groups, and can be used to access an environment for creating rules for ad groups. Here, rules with two different types of operations can be created—pausing an ad group, and changing an ad group max CPC. Similarly, the contextual submenu 218 can be used to access environment for creating rules for campaigns. From the submenu 218, rules with two different types of operations can be created—pausing the campaign, and changing a daily budget.

The rule creation options shown in FIG. 2A are an example default set of rule creation options that available to all advertisers. As will be describe in more detail below, advertisers may also define customized operations for creating rules, and associate the customized rules with particular campaign entities. If such customized operations are defined, they are shown in the automation menu 210 if the user interface from which the automation menu is invoked is a campaign level that corresponds to an associated customized operation.

Figure 2B:
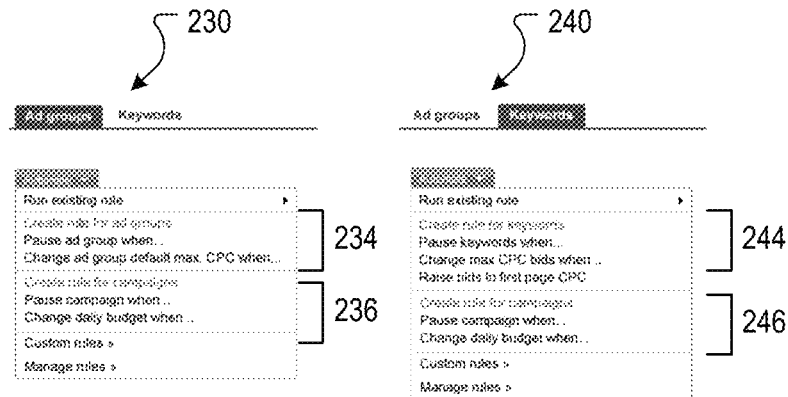
FIGS. 2B and 2C are illustrations of automation menus for different campaign entities at different campaign levels.
Figure 2C:
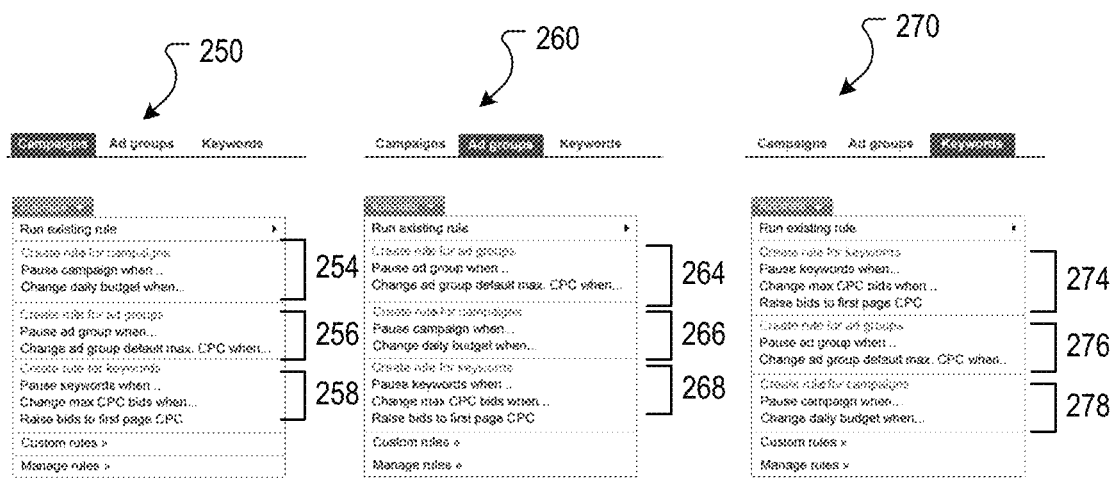

In general, an automation menu for a particular user interface corresponds to particular campaign level and campaign entities to which the user interface corresponds. FIGS. 2B and 2C are illustrations of automation menus for different campaign entities at different campaign levels. The automation menus 230 and 240 of FIG. 2B are automation menus that are generated at the campaign level for user interfaces that respectively present ad groups and keywords at the campaign level. The automation menu 230 includes contextual submenus 234 and 236. The contextual submenu 234 corresponds to advertising groups, and can be used to create rules for advertising groups. Likewise, the contextual submenu 236 corresponds to campaigns, and can be used to create rules for campaigns. The automation menu 240 is similar to the automation menu 230, including two contextual submenus 244 and 246. The contextual submenu 244 corresponds to keywords, and the contextual submenu 246 corresponds to campaigns.

The automation menus 250, 260, and 270 of FIG. 2C are automation menus that are generated for user interfaces that present all advertising campaigns associated with an advertiser. The automation menu 250 is generated in the user interface from which the user may select multiple campaigns, and includes contextual submenus 254, 256, and 258, that are respectively associated with campaigns, ad groups, and keywords. Likewise, the contextual submenu 260 is generated in a user interface in which a user may select multiple advertising groups from multiple campaigns, and includes contextual submenus 264, 266, and 268 that are respectively associated with advertising groups, campaigns, and keywords. The contextual submenu 270 is generated in a user interface in which a user may select multiple keywords for multiple campaigns, and includes contextual submenus 274, 276, and 278 that are respectively associated with keywords, advertising groups, and campaigns.

Figures 3, 4:
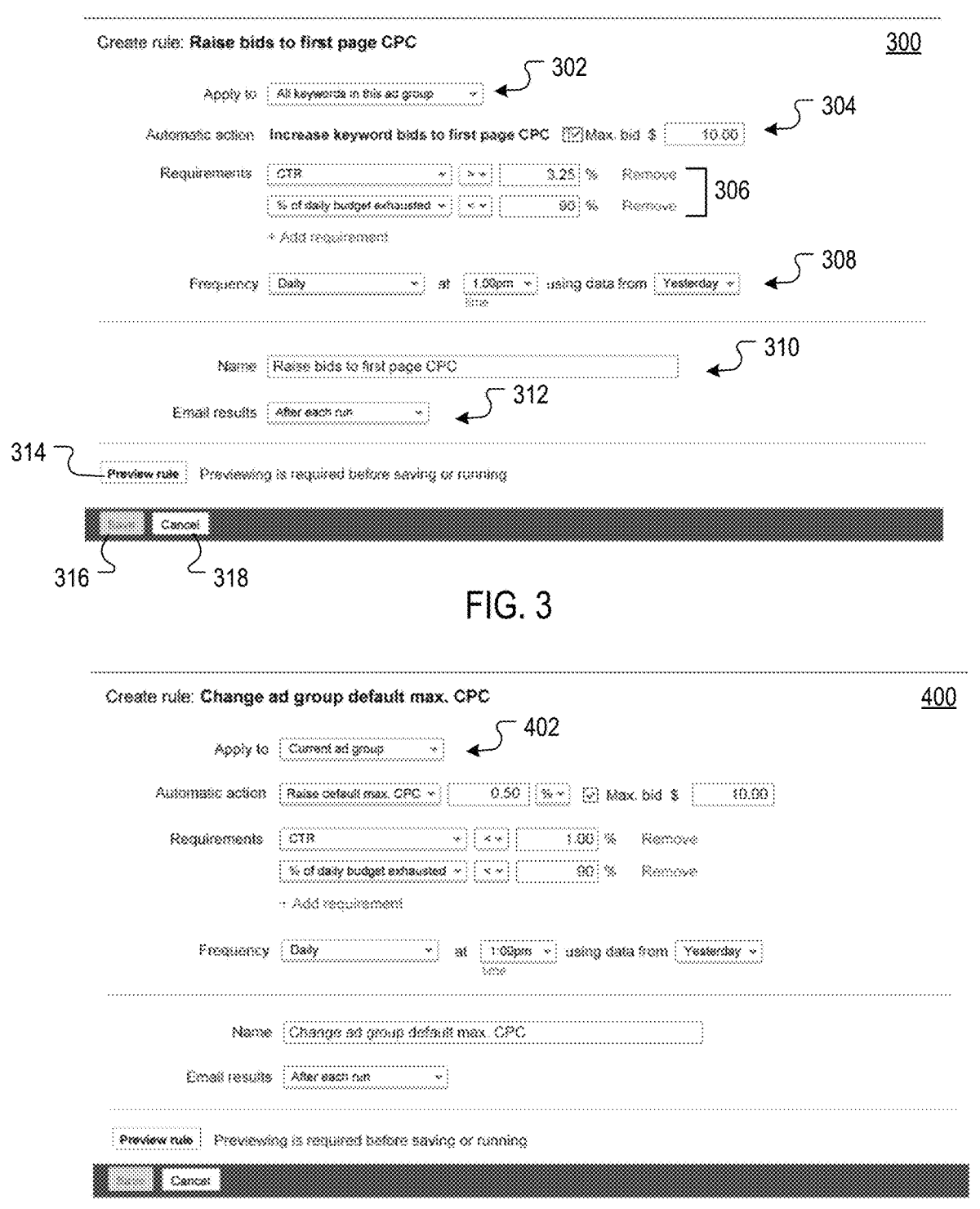

FIG. 3 is an example user interface 300 for keyword rules at an ad group level. The user interface 300, for example, can be accessed through an automation menu, or through another user interface element that can be used to invoke a rule creation environment. The user interface 300 is being used to create a rule titled "Raise bids to first page CPC."

An apply menu 302 is used to select campaign entities to which the rule will be associated. As shown in FIG. 3, the rule is currently selected to be applied to all keywords in a selected advertisement group. An alternative application selection could be, for example, a subset of keywords within an advertisement group.

The rule defines a corresponding operation 304 that, when executed, results in an increase in keyword bids for all keywords in the ad group, up to a maximum bid of $10, or some other value specified by the advertiser. For example, if the operation were to be executed, and a current first page cost per click for certain keywords is $4.50 and current keyword bids in the ad group are $3.25, then bid entities for the current keyword bids are increased to $4.50.

Also associated with the rule are conditions that define the event that will result in execution of the operation. The conditions are defined by requirements 306, each with different corresponding condition thresholds. The example condition shown are a keyword click through rate of 3.25% or higher, and an advertisement group spent budget of 90% or less. Accordingly, provided the budget for the advertisement group is not almost exhausted (e.g., less than 90% spent), bids for high-performing keywords (e.g., keywords with the click through rate of 3.25% or higher) will be increased up to a maximum of $10. Additional requirements can be added by the user in response to the user selecting the "+Add requirement" link.

Frequency menu items 308 are used to define one or more frequency parameters for the rule. Frequency parameters are used to define the frequency and frequency conditions at which the rule is executed. As shown in FIG. 3, the rule is to be executed daily at 1:00 PM using performance data from the prior day. Other frequencies can also be used, such as weekly, monthly, or even a one-time frequency. Likewise, different times can be used, and performance data can be used from other time periods, such as data from the last week, or even data from the last month. In some implementations, rules can be defined with frequency parameters, and each rule defined with the default frequency parameters are executed at the same frequency.

The user interface 300 includes a name input field 310 in which a user may type the name of the rule, and a reporting menu item 312 through which a user may specify an e-mail reporting frequency.

The user interface 300 also includes a preview rule button 314. In some implementations, such as the implementation shown in FIG. 3, the rule must be previewed before the rule can be persisted to the scripted rules 130 for use in the automated management of an advertising campaign.

A save button 316 and a cancel button 318 are also included in the user interface 300. As depicted in FIG. 3, the save button 316 is currently disabled, indicating that the rule has not been previewed. Once the rule is previewed, the rule may be saved by use of the save button 316. Once the rule is saved, the rule will be available in the application menu for user interfaces that correspond to campaign entities to which the rule is to be applied as specified by the apply menu 302. Accordingly, by creating multiple rules and associating each with different campaign entities, the scripting system 118 creates a context-based rule application environment.

The options available in the apply menu 302 can, in some implementations, differ depending upon the particular campaign entity level from which a user invoked the user interface 300. The options vary because the campaign management entities are associated according to a hierarchy in which the advertisement entities, budget entities, targeting entities, and bid entities are subordinate to the advertisement group entities, and the advertisement group entities are subordinate to the campaign management entities. Thus, in some implementations, a rule applied to any campaign entity at a particular node in a hierarchy may also be selectively applied to other campaign entities of the same type but at different nodes in the hierarchy.

For example, as described above, the user interface was invoked at an advertisement group level (i.e., invoked from a user interface in which keywords for a particular advertisement group are shown). Accordingly, the available options to which the rule may be applied are all keywords within the advertisement group, and selected keywords within the advertisement group. In some implementations, if the user interface were invoked at a campaign level (i.e., invoked from a previous user interface in which keywords for a particular advertisement campaign are shown), then the available options to which the rule may be applied are all keywords in the particular campaign, and a subset selected keywords within the advertisement campaign. Likewise, if the user interface were invoked from user interface in which keywords were shown for all advertising campaigns for a particular advertiser (e.g., an "all campaigns" level), then the available options to which the rule may be applied are all keywords for all campaigns, and a subset of selected keywords from the advertisement campaigns.

Accordingly, any one rule associated with an advertising campaign entity can further be associated with all campaign entities subordinate to the advertising campaign entity (e.g., targeting entities such as keywords). Likewise, the condition for the rule can also be defined for a campaign management entity subordinate to the advertising campaign entity (e.g., the targeting entities that are subordinate to the advertising campaign entity).

In some implementations, the user interface 300 is a default user interface for one of several default rules that are available to all advertisers. Other default rules at the keyword level include, for example, changing the max CPC bid, and pausing particular keywords. For example, the contextual submenu 214 of FIG. 2 includes a respective menu item for each of the user interfaces. Conditions necessary for defining events for the execution of particular operations to change the max CPC bid of keywords, and pausing particular keywords, can be defined by users in the respective user interfaces.

FIG. 4 is an example user interface 400 for ad group rules at an ad group level. The user interface 400 can, for example, be accessed through an automation menu, or through another user interface element that can be used to invoke a rule creation interface. The user interface 400 is being used to create a rule titled "Raise bids to first page CPC." The user interface environment is similar to the user interface 300 of FIG. 3. The rule being defined by the user interface 400 results in a 50% increase in the maximum cost per click for an advertisement group if two conditions are met. The first condition is that the advertisement group is a low performing advertisement group (e.g., with the click through rate less than 1%), and the second condition is that the budget for the advertisement group is not almost exhausted (e.g., less than 90% of the daily budget has been spent).

Thus, the condition of the rule is a click through rate threshold for the advertisement group defined by the advertisement group entity meeting a first threshold. The operation of the rule is adjusting a bid defined by a bid entity associated with the advertisement group entity so that the bid meets a cost per click value that increases the likelihood that an advertisement of the advertisement group is displayed.

The options available in the apply menu 402 can, in some implementations, differ depending upon the particular campaign entity level from which a user invoked the user interface 400. As shown in FIG. 4, the user interface 400 was invoked at an advertisement group level. Accordingly, the available options to which the rule may be applied to are selected advertisement group, all advertisement groups in a selected campaign, and all advertisement groups in all campaigns. In some implementations, if the user interface were invoked at a campaign level, then the available options to which the rule may be applied are selected advertisement groups, or all advertisement groups in a particular campaign. Likewise, if the user interface were invoked from an all campaigns level, then the available options to which the rule may be applied are selected advertisement groups, all advertisement groups, and all campaigns.

In some implementations, the user interface 400 is a default user interface for one of several default rules that are available to all advertisers. Other default rules at the advertising group level include, for example, pausing an advertisement group. For example, the contextual submenu 216 of FIG. 2 includes a respective menu item for each of the user interfaces. Conditions necessary for defining events for the execution of the particular operations associated with the advertising groups can be defined by users in the respective user interfaces.

Figures 5, 6:
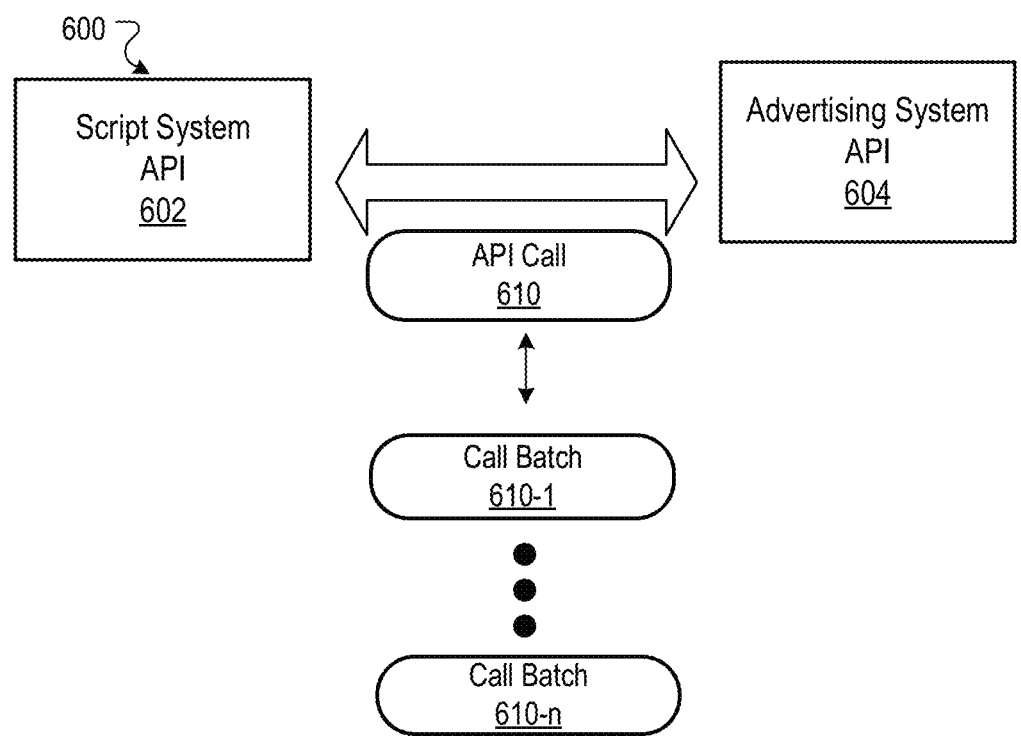
FIG. 5 is an example user interface for campaign rules at an ad group level.
FIG. 6 is a block diagram depicting a batching technique for API calls.

FIG. 5 is an example user interface 500 for campaign rules at an ad group level. In FIG. 5, the campaign management entity is an advertising campaign entity, and the conditions 506 of the rule are a click through rate threshold for the campaign identified by the camping entity not meeting a first threshold and a traffic parameter (impressions) of the campaign not meeting a second threshold. The operation 504, upon execution, results in a pausing of the campaign provided the event defined by the conditions occur to preclude the serving of advertisements associated with the campaign.

The options available in the apply menu 502 can, in some implementations, differ depending upon the particular campaign entity level from which a user invoked the user interface 500. As shown in FIG. 5, the user interface 500 was invoked at an advertisement group level for a selected campaign. Accordingly, the available options to which the rule may be applied are currently selected campaign, and all campaigns. In some implementations, if the user interface were invoked at an all campaigns level for advertising campaigns, then the available options are selected campaigns and all campaigns. Otherwise, the only available option to which the rule may be applied is all campaigns.

In some implementations, the user interface 500 is a default user interface for one of several default rules that are available to all advertisers. Other default rules at the advertising group level include, for example, changing a daily budget. For example, the contextual submenu 218 of FIG. 2 includes a respective menu item for each of the user interfaces. Conditions necessary for defining events for the execution of the particular operations associated with the advertising groups can be defined by users in the respective user interfaces.

Batching API Calls

In some implementation the scripting system 118 is implemented in a manner in which it must communicate with the advertisement management system 116 though one or more APIs. Additionally, requests for data and changes to data may result in multiple data elements being requested and modified for a script execution for an API call. This can result in multiple API calls between the respective systems. Furthermore, some API calls may be prone to failure due to the sheer size of the data set(s) underlying the call In some implementations, the system 118 generates API call batches for more efficient API utilization. For example, multiple update requests for particular entities of a same type can be issued in a single API batch rather than one at a time. When batching the API calls, the system 118 can consider such factors as a maximum batch size defined by a cardinality limit, batching when the script request is the sending of an update to the advertising management system API, and resubmitting a batch request with failing entities removed so that the batch execution can at least be partially successful.

FIG. 6 is a block diagram depicting a batching technique 600 for API calls. As depicted in FIG. 6, a script system 602 generates an API call 610 that is a batching of two or more API calls 610-1 . . . n to the advertising system API 604. During script execution of a script, the scripting system 118 identifies requests that are collectively for a first cardinality of first entities of a same type and corresponding to the campaign management entity. For example, the script may require several API calls for keyword entities and bid entities. The API calls for the keyword entities are respectively batched into a single API call, and the API calls for the bid entities are respectively batched into another single API call.

The number of entities for each API call, however, are limited to a cardinality limit based on the entity type. The cardinality limit may vary for each entity type, as the time to process each call for each particular entity type may vary. For example, an API call for keywords may be limited to 10,000 keywords, and an API call for bids may be limited to 5,000 bids. Thus, if the number of entities for a batched API call exceeds the cardinality limit of the corresponding entity type, two or more API calls will be generated, each corresponding to up to the respective cardinality limit of entities.

Figure 7:
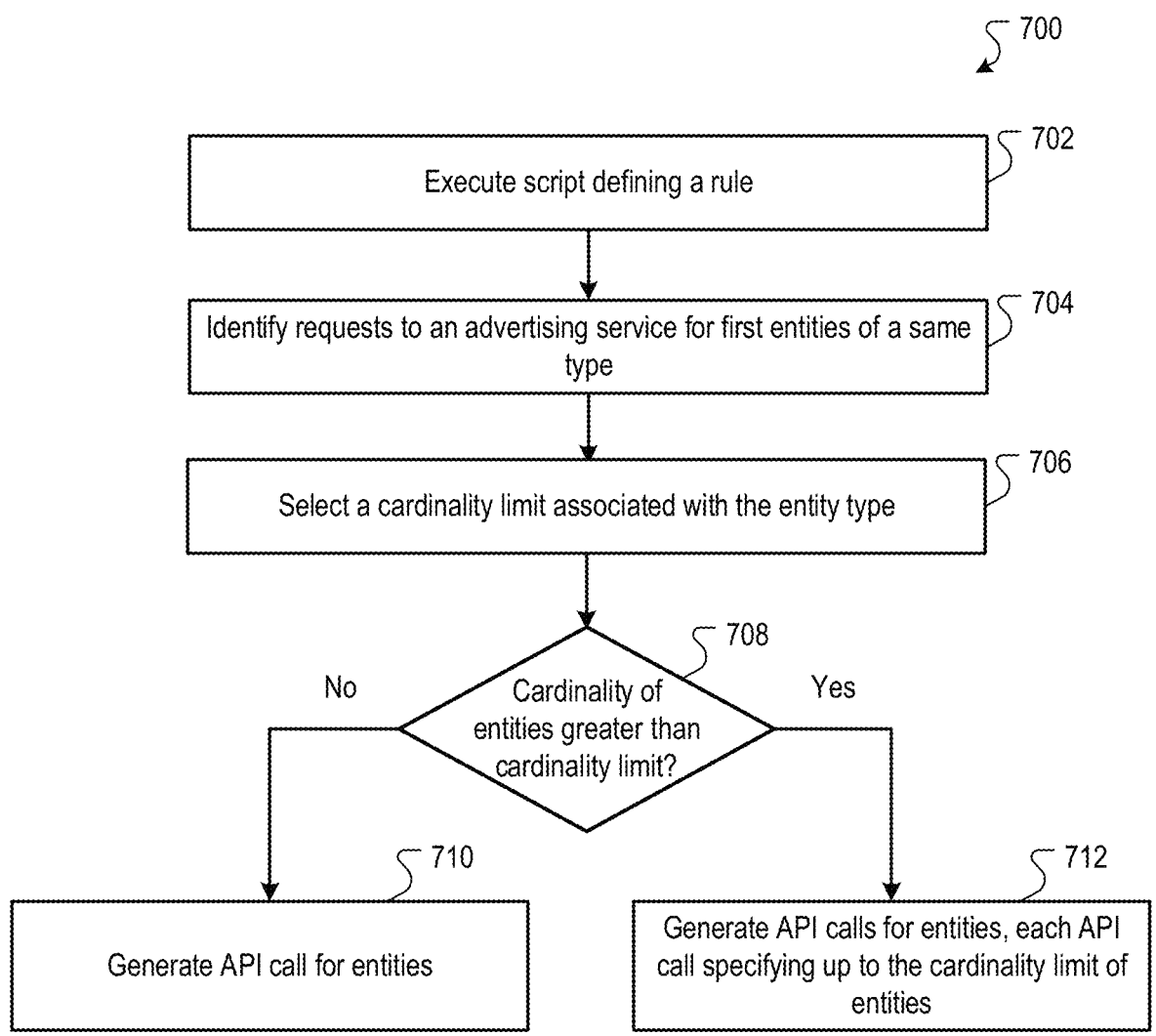
FIG. 7 is a flow diagram of an example process for batching API calls.

FIG. 7 is a flow diagram of an example process 700 for batching API calls. The process 700 can be implemented by a data processing apparatus in which the scripting system 118 is implemented.

The process executes a script defining a rule (702). The rule is associated with a campaign management entity of an advertising campaign. The rule defines an operation that specifies an entity change for the associated campaign management entity.

The process 700 identifies requests to an advertising service (704). The requests are collectively for a first cardinality of first entities of a same type and corresponding to a particular campaign management entity, e.g., advertisement updates for a particular advertising campaign.

The process 700 selects a cardinality limit associated with the entity type (706). For example, the process can access data defining respective cardinality limits for advertisements, keywords, and advertisement groups. Each respective cardinality limit can be different from each other respective cardinality limit. An example process for determining cardinality limits is described with reference to FIG. 8 below.

The process 700 determines if the first cardinality of entities is greater than the cardinality limit (708). If the first cardinality of entities is greater than the cardinality limit, then process 700 generates two or more API calls to the advertising service for the first entities, each of the API calls specifying up to the cardinality limit of first entities (712). This ensures that a particular batch call does not exceed a maximum allowed size. For example, the first entities are keywords, the first cardinality is 17,000, and the cardinality limit for keywords is 10,000, then two batches are generated—the first for 10,000 keywords, and the second for the remaining 7,000 keywords. Conversely, if the first cardinality of entities is not greater than the cardinality limit, then the process 700 generates an API call to the advertising service for the first entities (710).

Figure 8:
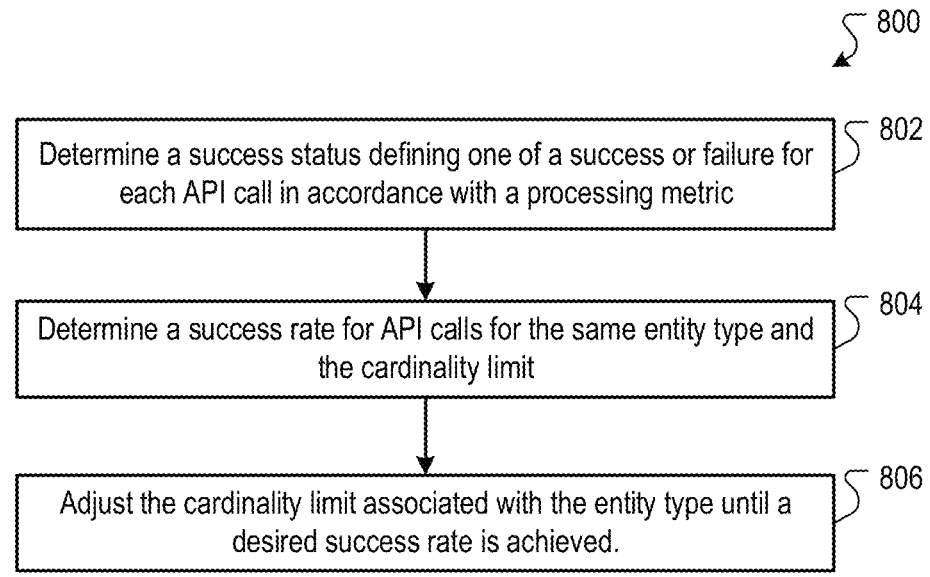
FIG. 8 is a flow diagram of an example process for determining cardinality limits based on campaign management entity types.

The cardinality limits can be set by system administrators, based, for example, on observed failures (e.g., API call timeouts, etc.). However, in some implementations, the scripting system can automatically adjust the cardinality limits of each entity type. FIG. 8 is a flow diagram of an example process 800 for determining cardinality limits based on campaign management entity types. The process 700 can be implemented by a data processing apparatus in which the scripting system 118 is implemented.

The process 800 determines a success status defining one of a success or failure for each API call in accordance with a processing metric (802). For example, if the processing metric is a timeout, the process 800 determines which API calls timed out (failed) and which API calls did not time out (succeeded).

The process 800 determining a success rate for API calls for the same entity type and the cardinality limit (804). For example, for a particular cardinality limit for keywords, e.g., 12,000, the process determines a success rate, e.g., 80%. Accordingly, 20% of the API calls are timing out.

The process 800 adjusts the cardinality limit associated with the entity type until a desired success rate is achieved (806). For example, the process 800, as long as the success rate is below a desired rate, adjusts the cardinality limit downward. For API calls at the newly adjusted cardinality limit, a new rate is determined over a time period, e.g., six hours. The process continue until a desired success rate is achieved, e.g., 90%, 100%, or some other value.

In some implementation, sending a batch of entities succeeds or fails in binary fashion, e.g., if a single update in the batch fails, the entire batch fails. The, the larger the batches, the higher the likelihood of failure. Accordingly, cardinality limits can also be set so that a high success rate can be ensured even when timeouts do not occur. Thus, if an upper limit for a timeout for a particular entity type is 10,000, the system 118 may nevertheless set the cardinality limit to, e.g., 5,000 to reduce the likelihood of batch failures due to the update failure of a single entity.

In some implementations, in the event of an update failure of a particular entity, data describing the API failure is received by the system 118. The system 118 then generates a subsequent API call to the advertising service for the first entities specified in the particular API call. However, the subsequent API call is exclusive of the failing first entity, i.e., the failing first entity is removed. The process continues until the batch succeeds.

Additionally, cardinality limits for a particular entity type may also vary depending on the nature of the request. For example, for retrieval operations, a higher cardinality limit may be set, as the retrieval operation may not involve updates or changes on the advertising serving side, and may be service relatively quickly. However, for updates, the cardinality limit may be lower, as updates may fail more often than retrieval operations.

Other factors in setting cardinality limits and batching API requests can also be considered.

Heuristic Based Caching and Prefetching

Utilizing caching and prefetching is another way to more efficiently manage API calls. Prefetching occurs when a data associated with a previously return data set for a previous API call is requested. The prefetched data are stored in local memory of an apparatus that is executing the script, and subsequent requests for the data need only query the local cache for service, thus reducing the number of API calls required.

For example, assume following script is being executed:

```
var keywords = adgroup.getKeywords( );
for (var i =keywords; i < keywords.length; i++) {
    var impressions = keywords[i].getImpressions("yesterday");
}
```

The script is executed sequentially. The first request results in a return of an array of keywords for an advertising group. The next request is implemented in a for loop, and issues a request for impressions for each returned keyword in a sequential manner. Assuming 1,000 keywords are returned in response to the first request, the second request would result in a separate impression query for each keyword, and thus would generate a separate API call for each keyword.

The system 118, in some implementations, implements a prefetching and caching process to reduce the number of API calls. For example, because the previous API call returned an array of 1,000 keywords, and the subsequent API call is requesting a second data object using the previously returned entity as an index (i.e., the second data are associated with the returned data), it is very likely that the second data will be requested for the entire set of keywords. Accordingly, the API call is expanded to include a request for the second data for each of the entities returned in response to the first API call. Thus, when the command getImpressions ("yesterday") is evaluated, the system 118 determines that the request is for addition data related to a particular instance of a returned data set (e.g., impressions for a particular keywords in a set of keywords). In response, the system 118 expands the request to request to request yesterday's impressions for all keywords that were provided for the original request, e.g., all keywords in the returned array of keywords. This leads to large savings in terms of queries to the API servers in the advertising system 118.

Figure 9:
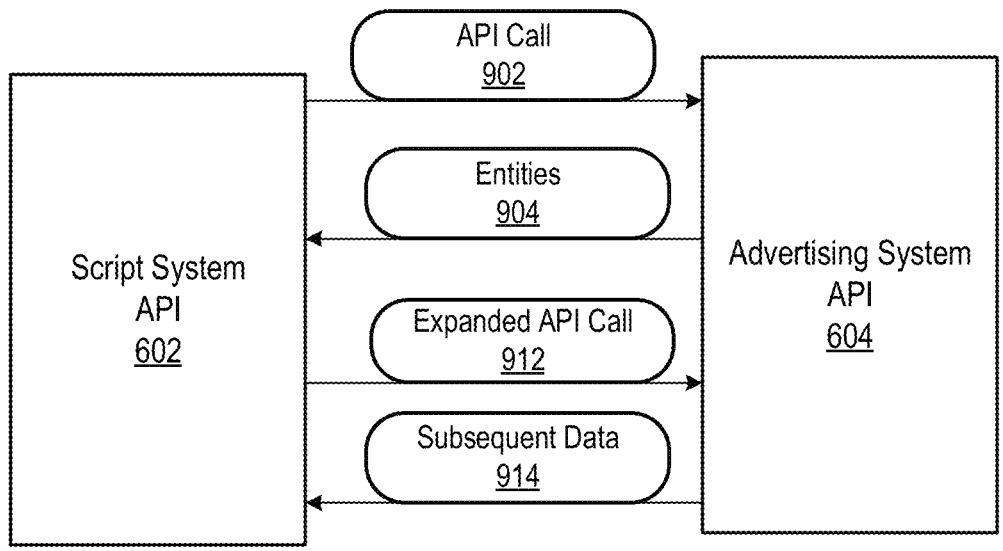
FIG. 9 is a block diagram depicting an expanded API call to facilitate caching and prefetching of data for an API call.
Figure 10:
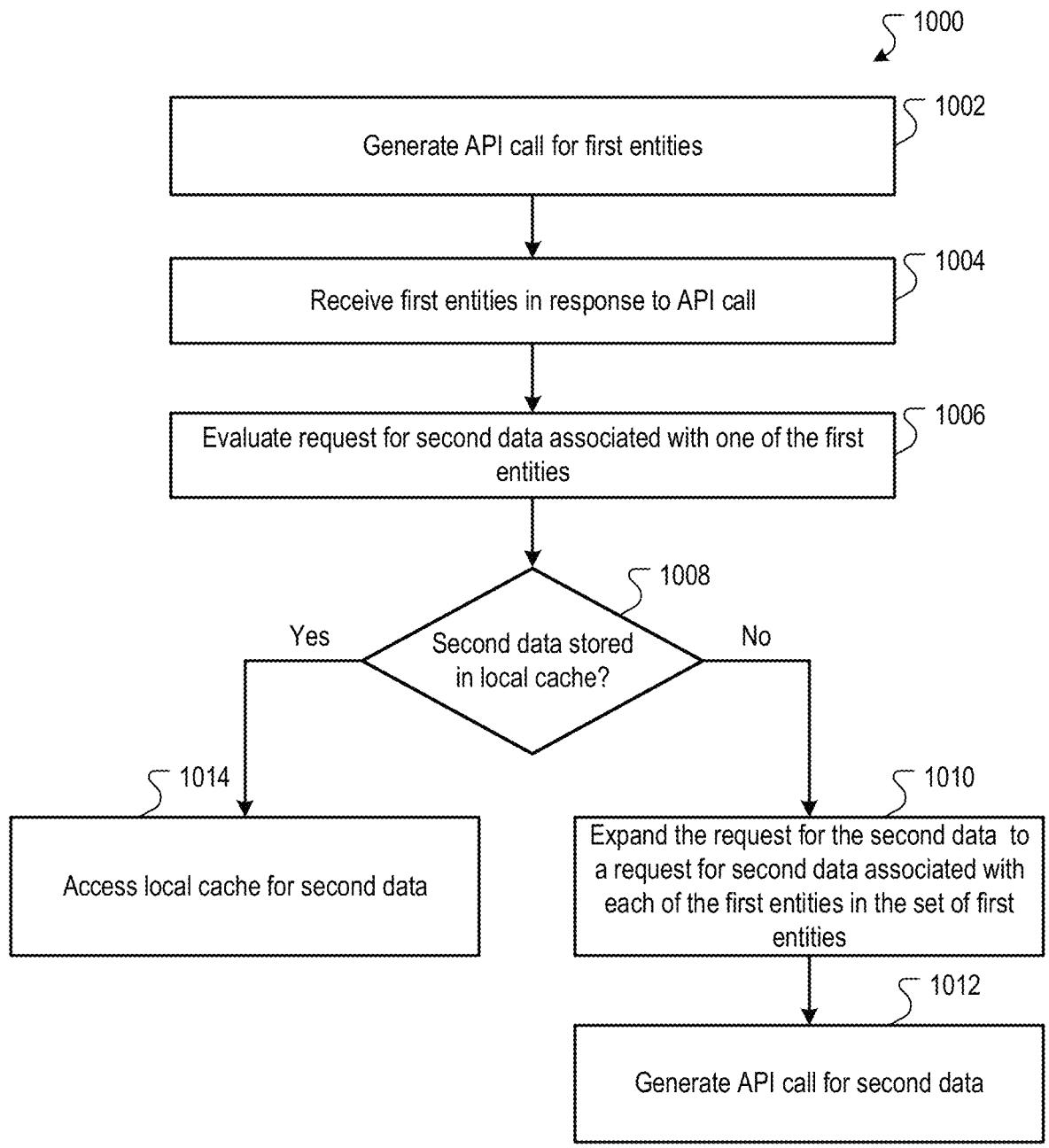
FIG. 10 is a flow diagram of an example process for expanding an API call.

FIG. 9 is a block diagram 900 depicting an expanded API call to facilitate caching and prefetching of an API call. FIG. 9 is described with reference to FIG. 10, which is a flow diagram 1000 of an example process for expanding an API call. The process 1000 can be implemented in a data process apparatus that is used to implement the scripting system 118.

The process 1000 generates a first API call (902) to an advertising service (1002). The first API call 902 is for first entities, e.g., keywords for an advertisement group.

The process 1000 receives the entities 904 in response to the API call (1004). For example, and array of keywords is returned, and the keywords are stored in a local cache.

The process 1000 evaluates a request for second data associated with one of the first entities (1006). For example, the process evaluates a command for impressions for one of the returned keywords.

The process 1000 determines whether the second data associated with the first entity is stored in the local cache (1008). For example, the process 1000 queries the local cache for an associated impression value.

If the second data is not stored in the local cache, the process 1000 expands the request for second data associated with the first entity to an expanded request for second data associated with each of the first entities in the set of first entities returned in response to the original request (1010). For example, the request for impressions for one of the keywords is expanded to include a request for impressions for each keyword.

The process 1000 then generates an expanded API call 1012 to the advertising service for the expanded request, and receives the data in response. Thereafter, for each additional request (e.g., the remaining iterations of the for loop described above), the process 1000 need only query the local cache (1014).

In some implementations, the prefetching can be subject to the cardinality limits described above. For example, if an expanded API call would result in a request for 20,000 entities that are related to a received set of entities, the API calls can be batched and processed a described above with respect to batching API calls.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 11:
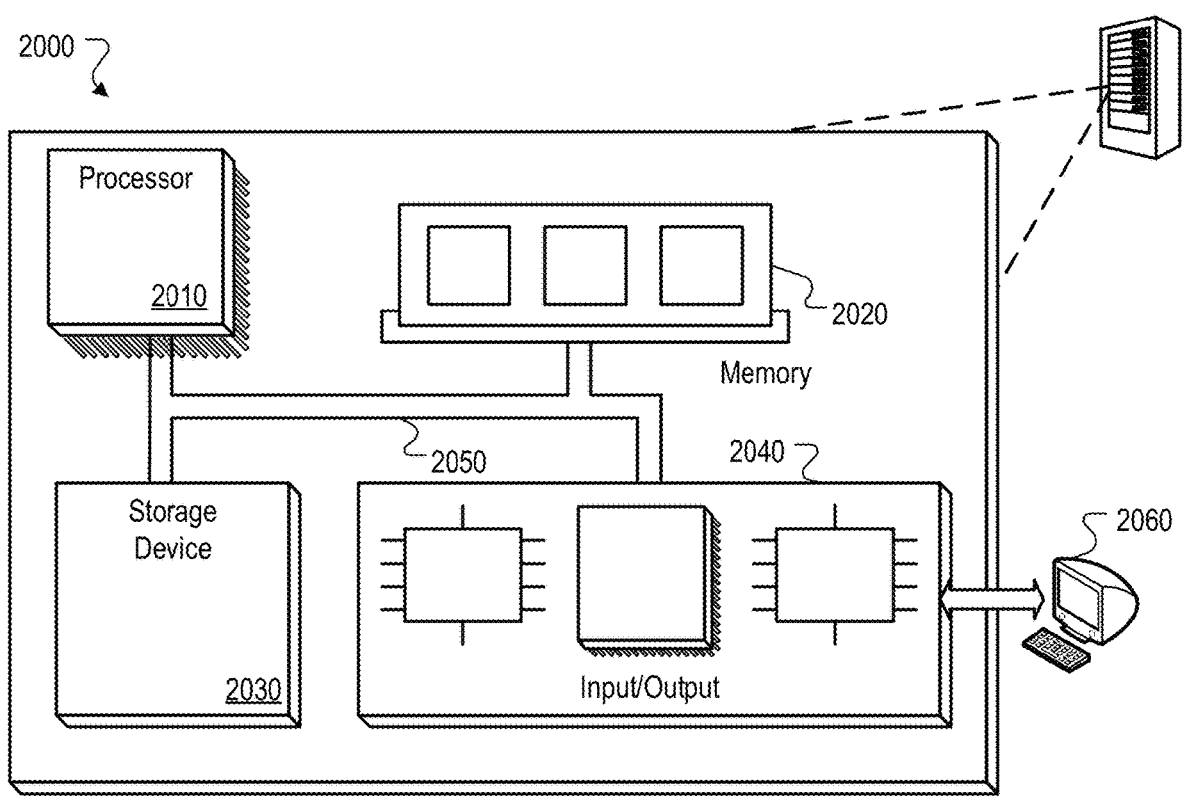
FIG. 11 is a block diagram of a data processing apparatus system.

An example of computing system in which the above-described techniques can be implemented is shown in FIG. 11, which shows a block diagram of a data processing apparatus system. The system 2000 can be utilized to implement the systems and methods described herein. The architecture of the system 2000 can, for example, be used to implement a computer client, a computer server, or some other computer device.

The system 2000 includes a processor 2010, a memory 2020, a storage device 2030, and an input/output device 2040. Each of the components 2010, 2020, 2030, and 2040 can, for example, be interconnected using a system bus 2050. The processor 2010 is capable of processing instructions for execution within the system 2000. In one implementation, the processor 2010 is a single-threaded processor. In another implementation, the processor 2010 is a multi-threaded processor. The processor 2010 is capable of processing instructions stored in the memory 2020 or on the storage device 2030.

The memory 2020 stores information within the system 2000. In one implementation, the memory 2020 is a computer-readable medium. In one implementation, the memory 2020 is a volatile memory unit. In another implementation, the memory 2020 is a non-volatile memory unit.

The storage device 2030 is capable of providing mass storage for the system 2000. In one implementation, the storage device 2030 is a computer-readable medium. In various different implementations, the storage device 2030 can, for example, include a hard disk device, an optical disk device, or some other large capacity storage device.

The input/output device 2040 provides input/output operations for the system 2000. In one implementation, the input/output device 2040 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 2060.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
   a data processing apparatus including one or more computers; and
   a computer storage system storing instructions that when executed by the data processing apparatus cause the data processing apparatus to perform operations comprising:
   executing a script for a rule in response to detecting an event defined by the rule, the rule further defining an operation for changing a plurality of entities in response to detecting the event, the executing comprising:
   identifying a given quantity of entities per application programming interface (API) call that provides a target success rate for API calls, the given quantity being based on a respective success rate of previous API calls for each of a plurality of quantities of entities per API call, wherein the respective success rate for each quantity of entities represents a percentage of the previous API calls for the given quantity of entities that were successful;
   generating a first API call for a first set of the entities, the first set including up to the given quantity of the entities; and
   generating one or more additional API calls for remaining entities not included in the first set of the entities, each of the one or more additional API calls specifying up to the given quantity of the entities.

2. The system of claim 1, wherein the operations comprise:
   determining, for each of the plurality of entity quantities, the respective success rate of the previous API calls for a number of entities that matches the entity quantity; and
   determining, as the given quantity of entities, the entity quantity for which the success rate for the entity quantity meets the target success rate.

3. The system of claim 1, wherein the operations comprise determining the given quantity of entities by adjusting a quantity of entities included in API calls until the target success rate is achieved.

4. The system of claim 1, wherein the operations comprise determining the given quantity of entities, including:
   determining, for a first quantity of entities, a first success rate of previous API calls for the first quantity of entities;
   determining that the first success rate does not meet the target success rate; and
   in response to determining that the first success rate does not meet the target success rate, reducing the first quantity of entities to one or more second quantity of entities until one of the second quantity of entities has a success rate that meets the target success rate.

5. The system of claim 1, wherein the operations comprise:
   determining that the plurality of entities exceeds the given quantity of entities; and
   in response to determining that the plurality of entities exceeds the given quantity of entities, determining to split the plurality of entities into multiple API calls including the first API call and the one or more additional API calls.

6. The system of claim 1, wherein each entity in the plurality of entities is a first type of entity and wherein the given quantity of entities is specific to the first type of entities.

7. The system of claim 6, wherein a second quantity of entities per API call for a second type of entity is different from the given quantity of entities.

8. A method performed by a data processing apparatus, the method comprising:
   executing a script for a rule in response to detecting an event defined by the rule, the rule further defining an operation for changing a plurality of entities in response to detecting the event, the executing comprising:
  identifying a given quantity of entities per application programming interface (API) call that provides a target success rate for API calls, the given quantity being based on a respective success rate of previous API calls for each of a plurality of quantities of entities per API call, wherein the respective success rate for each quantity of entities represents a percentage of the previous API calls for the quantity of entities that were successful;
  generating a first API call for a first set of the entities, the first set including up to the given quantity of the entities; and
  generating one or more additional API calls for remaining entities not included in the first set of the entities, each of the one or more additional API calls specifying up to the given quantity of the entities.

9. The method of claim 8, further comprising:
  determining, for each of the plurality of entity quantities, the respective success rate of the previous API calls for a number of entities that matches the entity quantity; and
  determining, as the given quantity of entities, the entity quantity for which the success rate for the entity quantity meets the target success rate.

10. The method of claim 8, further comprising determining the given quantity of entities by adjusting a quantity of entities included in API calls until the target success rate is achieved.

11. The method of claim 8, further comprising determining the given quantity of entities, including:
  determining, for a first quantity of entities, a first success rate of previous API calls for the first quantity of entities;
  determining that the first success rate does not meet the target success rate; and
  in response to determining that the first success rate does not meet the target success rate, reducing the first quantity of entities to one or more second quantity of entities until one of the second quantity of entities has a success rate that meets the target success rate.

12. The method of claim 8, further comprising:
  determining that the plurality of entities exceeds the given quantity of entities; and
  in response to determining that the plurality of entities exceeds the given quantity of entities, determining to split the plurality of entities into multiple API calls including the first API call and the one or more additional API calls.

13. The method of claim 8, wherein each entity in the plurality of entities is a first type of entity and wherein the given quantity of entities is specific to the first type of entities.

14. The method of claim 13, wherein a second quantity of entities per API call for a second type of entity is different from the given quantity of entities.

15. A non-transitory computer readable storage medium storing software instructions executable by a data processing apparatus and that upon such execution cause the data processing apparatus to perform operations comprising:
  executing a script for a rule in response to detecting an event defined by the rule, the rule further defining an operation for changing a plurality of entities in response to detecting the event, the executing comprising:
    identifying a given quantity of entities per application programming interface (API) call that provides a target success rate for API calls, the given quantity being based on a respective success rate of previous API calls for each of a plurality of quantities of entities per API call, wherein the respective success rate for each quantity of entities represents a percentage of the previous API calls for the quantity of entities that were successful;
    generating a first API call for a first set of the entities, the first set including up to the given quantity of the entities; and
    generating one or more additional API calls for remaining entities not included in the first set of the entities, each of the one or more additional API calls specifying up to the given quantity of the entities.

16. The non-transitory computer readable storage medium of claim 15, wherein the operations comprise:
  determining, for each of a plurality of entity quantities, a success rate of previous API calls for a number of entities that matches the entity quantity; and
  determining, as the given quantity of entities, the entity quantity for which the success rate for the entity quantity meets the target success rate.

17. The non-transitory computer readable storage medium of claim 15, wherein the operations comprise determining the given quantity of entities by adjusting a quantity of entities included in API calls until the target success rate is achieved.

18. The non-transitory computer readable storage medium of claim 15, wherein the operations comprise determining the given quantity of entities, including:
  determining, for a first quantity of entities, a first success rate of previous API calls for the first quantity of entities;
  determining that the first success rate does not meet the target success rate; and
  in response to determining that the first success rate does not meet the target success rate, reducing the first quantity of entities to one or more second quantity of entities until one of the second quantity of entities has a success rate that meets the target success rate.

* * * * *